Nov. 9, 1965 G. E. HAGEN 3,217,302

MAGNETIC STORAGE DEVICE

Filed June 2, 1960 8 Sheets-Sheet 1

INVENTOR
Glenn E. Hagen

BY Strauch, Nolan & Neale

ATTORNEYS

Nov. 9, 1965 G. E. HAGEN 3,217,302

MAGNETIC STORAGE DEVICE

Filed June 2, 1960 8 Sheets-Sheet 2

INVENTOR
Glenn E. Hagen

BY Strauch, Nolan & Neale
ATTORNEYS

Nov. 9, 1965 G. E. HAGEN 3,217,302

MAGNETIC STORAGE DEVICE

Filed June 2, 1960 8 Sheets-Sheet 3

INVENTOR
Glenn E. Hagen

BY [signature]

ATTORNEYS

Nov. 9, 1965 G. E. HAGEN 3,217,302

MAGNETIC STORAGE DEVICE

Filed June 2, 1960 8 Sheets-Sheet 4

INVENTOR
Glenn E. Hagen

BY Strauch, Nolan & Neale
ATTORNEYS

INVENTOR
Glenn E. Hagen
BY Strauch, Nolan & Neale
ATTORNEYS

INVENTOR
Glenn E. Hagen

BY Strauch, Nolan & Neale
ATTORNEYS

INVENTOR
Glenn E. Hagen
BY Strauch, Nolan & Neale
ATTORNEYS

MAGNETIC STORAGE DEVICE

Filed June 2, 1960 8 Sheets-Sheet 8

INVENTOR
Glenn E. Hagen
BY
Shrauck, Nolan + Neale
ATTORNEYS

United States Patent Office 3,217,302
Patented Nov. 9, 1965

3,217,302

MAGNETIC STORAGE DEVICE

Glenn E. Hagen, Southfield, Mass., assignor to Alwac International, Nassau, Bahamas, a corporation of Panama Filed June 2, 1960, Ser. No. 33,539
27 Claims. (Cl. 340—174.1)

The present invention relates to a random access magnetic memory storage device, and more especially to a novel memory device utilizing an elongated endless magnetic belt of substantial width for large storage capacity with means for controlling the belt for effective magnetic recording and play-back at high speed.

Various types of magnetic record members as are customarily used in computers for the storage of information which is to be repeatedly available at the shortest possible time intervals are shown in U.S. Patent No. 2,680,239. In magnetic drums heretofore extensively used, the coded informaiton is stored around the periphery of the drum in parallel channels, and the drum is driven at high rotational speeds with respect to the recording and/or play-back magnetic head or heads for each channel. One serious practical limitation is that the drum storage units which make the information available repeatedly at short time intervals are necessarily small in size.

Drums of about 18 inches in diameter and larger have been used, but there is a continued need for inexpensive storage elements having large memory storage capacity and short access time, and to meet this need, the size of the drum can be increased. However, that approach to the problem has a serious limitation due to the well known fact that the signal output from a pick-up head falls off logarithmically as the distance between the pick-up head and the signal channel surface increases. This raises problems of eccentricity of drum construction and costs, since the larger the drum size, the greater the cost of producing the drum surface free of eccentricity within necessary tolerances.

As one solution to this problem, floating or air-bearing heads as disclosed in my co-pending application Serial No. 432,534, filed May 26, 1954, were mounted for reciprocating movement along a radial line toward the center with resepct to the center of the rotating drum, making possible the use of substantially larger drum diameters. These heads are provided with one or more central air conduits through which air flows under pressure, escaping through apertures in the surface of the head facing the surface of the drum. The head may be mechanically biased toward the drum surface and the force of the air against the drum surface holds the head at a small spaced distance from the surface to thereby allow the head to follow irregularities over the drum surface.

To achieve better follow of depressions in the drum surface by the head and eliminate the requirement for a mechanical bias means, a flange is preferably provided around the head so that the air escaping from the apertures toward the drum surface is driven outwardly between the flange and the drum surface at a velocity such that a low pressure region is provided whereby the atmospheric pressure on the outside of the flange pushes the head toward the drum surface in accord with the Bernoulli principle. U.S. Patent No. 2,905,768 to Cronquist is exemplary of another floating head of this type. Thus, the head mounting containing both central air outlet apertures and the surrounding flange provide an "air bearing" for the head, which maintains the recording and/or reading heads at an almost uniform spacing from the drum surface as the drum rotates, adjusting for small irregularities in the drum surface normally encountered. These construction techniques have made practical the use of less expensive drums having somewhat greater diameters than is possible without these techniques.

However, these approaches have not provided the ultimate solution to the continued need for inexpensive large capacity magnetic storage units. Acceptance of data processing equipment by a large class of practical data processing applications which involve simplified computing techniques but require large memory units is prohibited primarily because of the high total cost of the storage unit which has adequate capacity and sufficiently short access time.

It is accordingly a principal object of the present invention to provide a magnetic recording device having a recording surface in the form of a wide, elongated endless magntic belt with novel means for maintaining the belt in proper alignment with the recording and/or reading head for each of the multiple parallel memory channels, within the close tolerances required for effective operation of a memory device of this type. While magnetic belts have been previously proposed, as shown for example in U.S. Patent No. 2,680,239, they have never been successfully used to my knowledge because of difficulties of attaining reliable high surface speed operation.

It is still another related object to provide novel means for centering the belt on a pair of driving drums while operating at velocities on the order of 1000 inches/second and for corrective tilt of each drum determined by the position of the belt edge on the delivered side of the drum to maintain the belt within close tolerances of its lateral reference position at all times and to avoid any observable lateral shift of the belt.

Still another related object is to provide such a control means for the magnetic recording belt which does not deleteriously affect the belt edges so that the belt will have long life in operation, and also means for preventing the belt from vibrating in a plane normal to the direction of belt movement between the driving pulleys.

It is still a further object of the present invention to provide a novel magnetic belt recording means of the foregoing type including a movable head mounting rack for positioning the recording and play-back pick-up heads as coupled with the control device for corrective positioning of the magnetic belt on its rollers as to produce an additional corrective repositioning of said head mounting rack to thus shift the heads instantaneously upon detection of an undesired lateral shift of the magnetic belt in the proper direction to thereby achieve virtually constant correct alignment between the heads and the signal channel on the belt within the necessary tolerances.

A further object of this invention is to provide a novel cross bar head mounting rack for the recording heads which is adapted to provide an immediate corrective lateral displacement of the cross bar according to any detected lateral displacement of the magnetic belt.

Another object resides in the provision of a novel air control valve for providing a continuous flow of air into an expansion chamber for effecting corrective adjustments to a belt drive unit.

A further major object of the present invention resides in a novel method and apparatus for positioning a head adapted to travel laterally across the width of the magnetic recording medium to thereby place the head in operative relationship with any preselected information channel on the recording medium.

Another object of the invention resides in providing a hollow pipe having a piston which is adapted to be blown by air under pressure applied to an end of the pipe to a preselected position determined by selectively retractable stop members for placing the electromagnetic head in operative relationship with a particular preselected information channel on a recording medium.

A still further object of the invention resides in providing spacers having thicknesses which vary in accordance with a binary code to be selectively placed into the path of and slide along with the piston to thereby determine the particular information storage channel on the recording medium with which the magnetic read-out head is to be placed in operative relation.

Other objects and advantages of the present invention will become apparent from the following description and claims, with reference in the description to the appended drawings, wherein:

FIGURE 8 is a partial front elevation view showing a novel arrangement for positioning a lateral travelling magnetic head adapted to be positioned in operative relationship with any one of the parallel information storage channels on magnetic belt 20;

Figure 10:
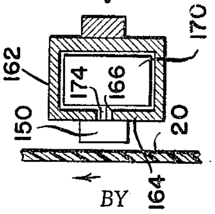
FIGURE 10 is an end elevation view in section taken along line 10—10 of FIGURE 9.
Figure 11:
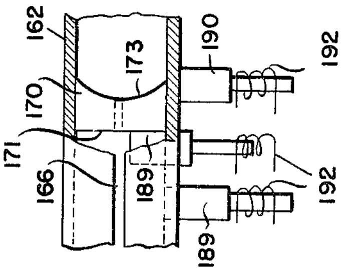
FIGURE 11 is a partial rear elevation view taken along line 11—11 of FIGURE 9.
Figure 12:
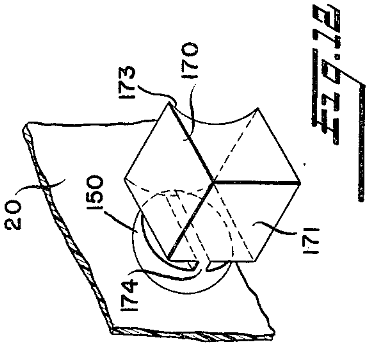
Figure 13:
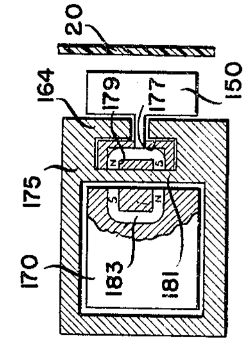

FIGURE 12 is a partial pictorial view showing how recording head 150 may be secured to piston 170 for selective positioning relative to different information channels on belt 20;

FIGURE 13 is an end elevation view in section, similar to FIGURE 10, of a modified arrangement for magnetically joining magnetic head 150 to piston 170.

Figure 14:
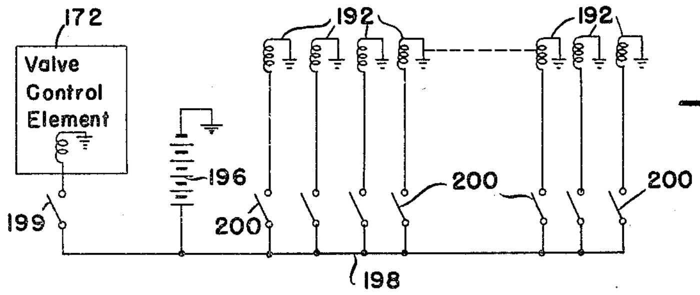
Figures 15, 16, 17, 18, 19:
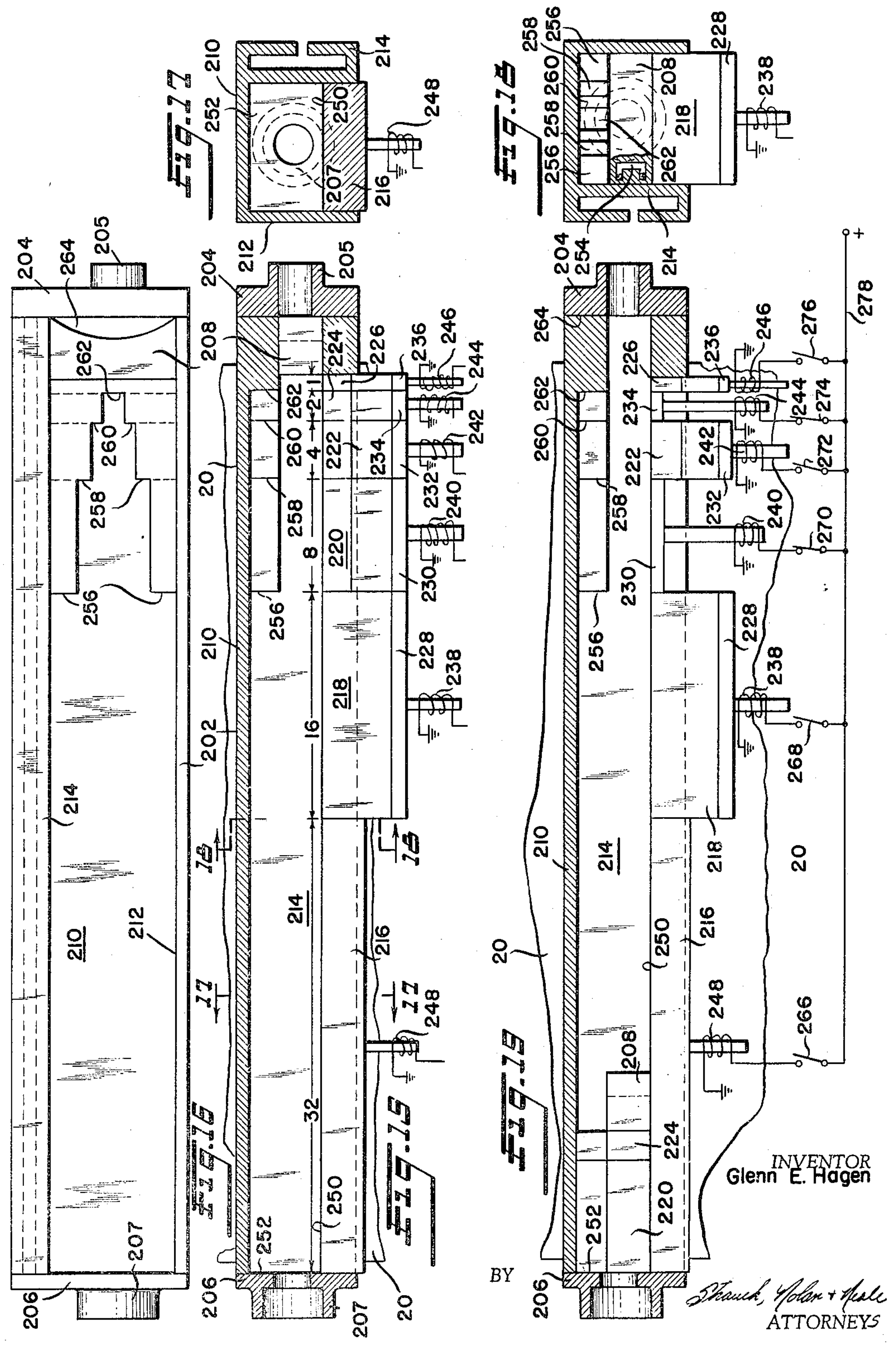

FIGURE 14 is a circuit diagram for controlling operation of the head positioning apparatus of FIGURES 8 through 13;

FIGURE 15 is a front elevation view in section of a further embodiment for positioning a laterally travelling magnetic head;

FIGURE 16 is a bottom plan view of the embodiment of FIGURE 15 with the sliding blocks and supporting members removed;

FIGURE 17 is an end elevation view in section taken along line 17—17 of FIGURE 15;

FIGURE 18 is an end elevation view in section taken along line 18—18 of FIGURE 15; and FIGURE 19 is a front elevation view in section similar to FIGURE 15 but showing two spacer blocks and piston 208 in a typical operating position to locate the recording head adjacent a desired information channel on belt 20.

Figure 1:
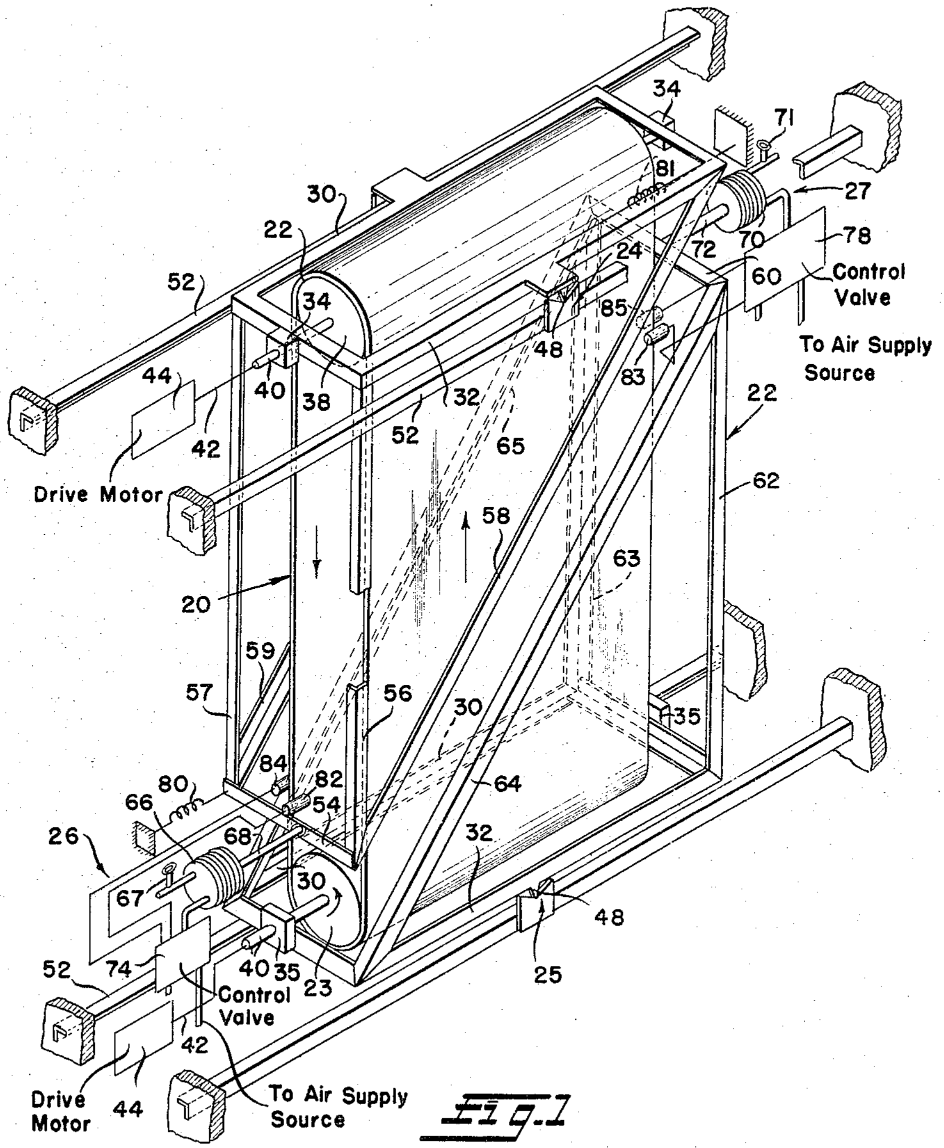
FIGURE 1 is a pictorial view which is partially diagrammatic, showing just the magnetic memory belt drive and centering apparatus according to the present invention, with the frame and certain portions of the controls for centering the belt shown schematically, in order to more clearly illustrate the invention.
Figure 2:
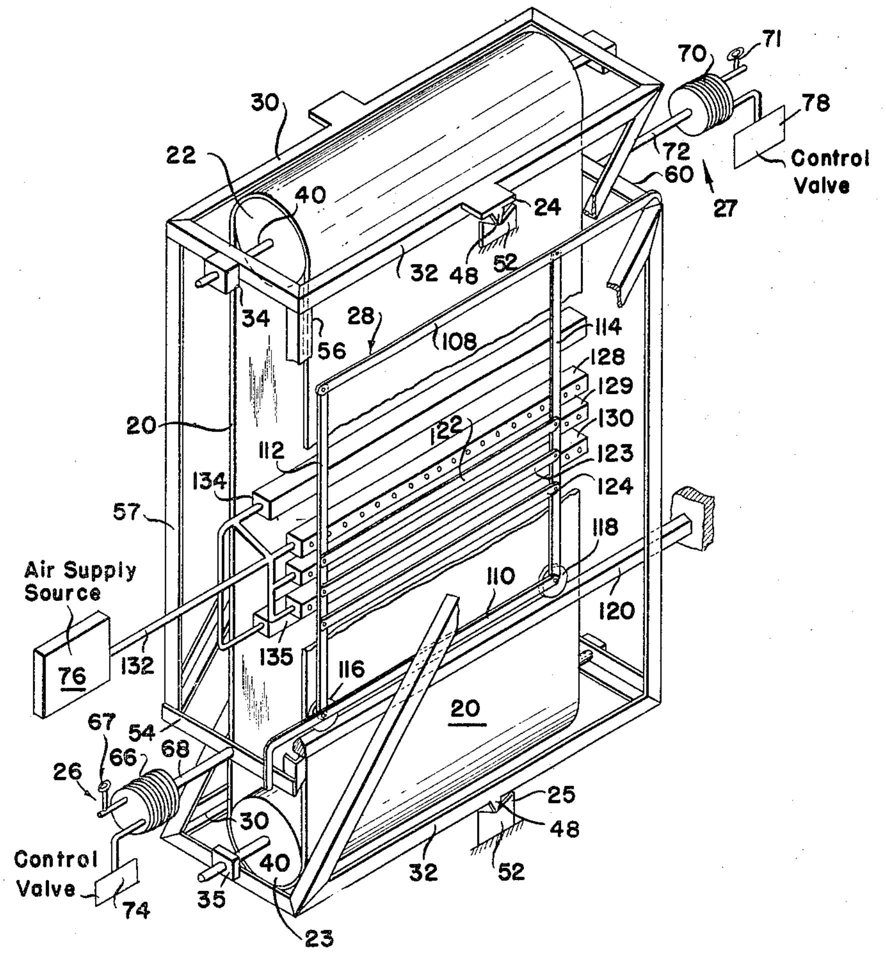
FIGURE 2 is a pictorial view as in FIGURE 1 showing additionally the recording head mounting rack.
Figure 3:
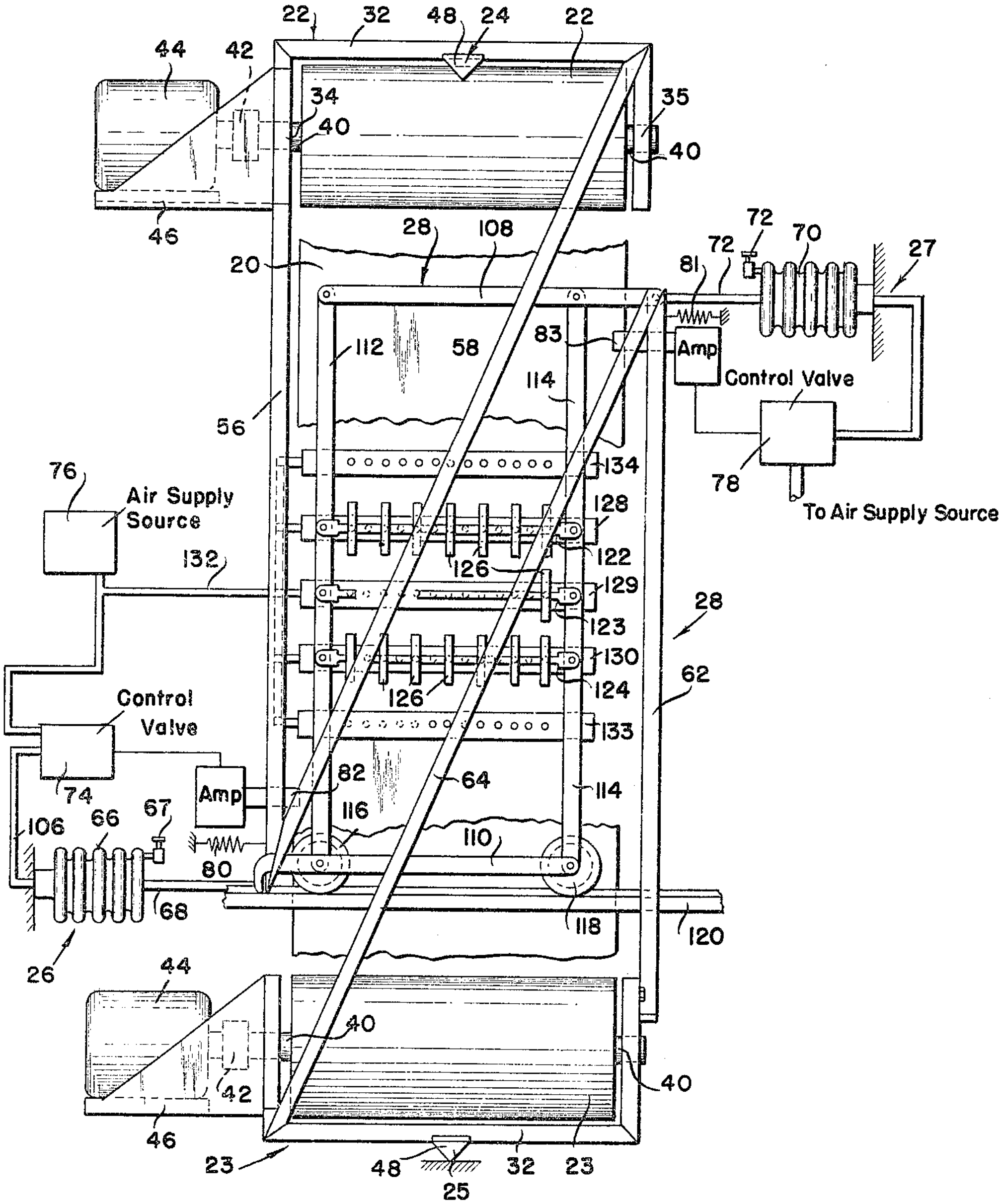
FIGURE 3 is a front elevation view of the magnetic storage unit of this invention with the belt broken away to show better the several parts.

Referring to the drawings, and especially to FIGURES 1 through 3, there is shown the novel system according to the present invention incorporating an endless magnetic belt generally indicated at 20 and carried on substantially parallel spaced pulley or drum drive units generally indicated at 22 and 23 which units are mounted on fulcrum means 24 and 25 with a control means 26 and 27 for changing the position of the respective axis of each of pulley units 22 and 23 to correct the lateral deviation of belt 20 from its desired position, and simultaneously making a corresponding corrective change in the position of the magnetic recording and/or play-back heads (see FIGURES 2 and 3) which are supported bya parallelogram frame 28 adjacent the belt surface centrally between drive units 22 and 23.

Each of drive units 22 and 23 may be constructed on a rectangular frame composed of two elogated metal support members 30 and 32 to the ends of which a pair of suitable bearing blocks 34 and 35, carrying aligned bearings, are suitably secured. Drive units 22 and 23 have small diameter end shafts 40 extending from opposite ends to be received in the inner races of the bearings in bearing blocks 34 and 35. The reduced end 40 of each drive unit may be connected as by means of a suitable flexible coupling unit 42 to the output shaft of a suitable electric motor 44 which is mounted on a bracket 46 secured to frame members 30 and 32 to pivot with the respective drive units 22 and 23.

Each of support members 32 has a bar 48 extending perpendicularly therefrom and provided with a V-shaped lower surface adapted to be received in a V-notch formed in part of the supporting frame 52 which serves as fulcrum providing pivotal movement of the pulley unit in a plane containing the axis of the pulley. Frame member 52 is mounted in a fixed frame or end walls. It will be apparent that the supporting frame including the various supporting members could take various forms to carry out the present invention in that the various particular designs can be readily evolved by those skilled in this art.

Upper support members 30 and 32 which pivot with upper dirve unit 22 are rigidly connected to a lower horizontal bar 54 by vertical rigid support members 56 and 57 and oblique support members 58 and 59, each of which is illustrated as having an L-shaped cross section. The corresponding lower support members 30 and 32 which pivot with the lower drive unit 23 are similarly connected to an upper horizontal bar 60 by vertical rigid support members 62 and 63, and by oblique members 64 and 65.

Control means 26 contains a positive displacement motor element such as air expansion chamber 66, which may for example be a bellows unit, having an output connecting link 68 that moves axially in accordance with the pressure of air supplied to air expansion chamber 66. The free end of link 68 is connected to horizontal cross bar 54 to effect a controlled pivotal movement of the upper drive unit 22 about the pivot axis at fulcrum 24. A similar air expansion chamber 70 and link 72 are provided adjacent upper horizontal bar 60 for effecting an independent, controlled pivotal movement of the lower drive unit 23 about the pivot axis of fulcrum 25.

Air is supplied to air expansion chamber 66 through control valve 74 from supply source 76 (see also FIGURE 3). A similar control valve 78 is provided for air expansion chamber 70 to control the lower drive unit 23. Since expansion chambers 66 and 70 are, in the illustrated embodiment, of a bellows type, springs 80 and 81 are connected to the lower horizontal bar 54 for upper drive unit 22 and upper horizontal bar 60 for lower drive unit 23 respectively to bias the drive units to a position where the bellows units 66 and 70 are compressed. Bleed valves 67 and 71 are provided to permit a controlled rate of air flow from bellows units 66 and 70 respectively.

Each of control valves 74 and 78 is actuated by a belt edge detecting means, such for example as photocells 82 and 83, which are actuated by the light from an adjacent source 84 and 85 respectively. The particular light and photocell arrangement may be of the type shown for example in U.S. Patent No. 2,643,117. While other types of protecting devices may be used, mechanical feeler and air jet types of detectors have a tendency to cause fraying of the edges on the belt during continuous high speed operation to thereby reduce the length of life of the belt.

Figures 5, 6:
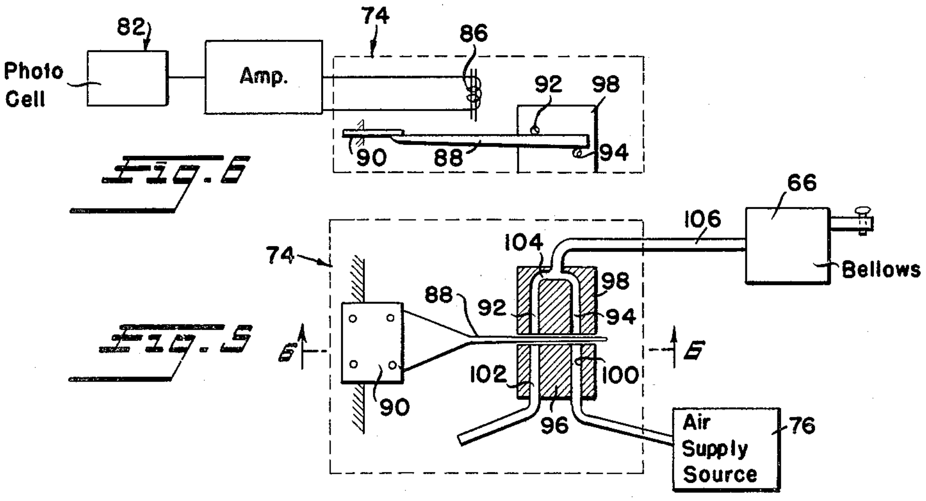
FIGURE 5 is a somewhat diagrammatic view of the photo-electrically controlled air valve controller for the bellows which determine the operation of the magnetic belt centering apparatus and head mounting rack.
FIGURE 6 is a view of the air valve controller taken along lines 6—6 of FIGURE 5.

Referring now to FIGURES 5 and 6, the output from photocell 82 may be amplified if necessary and applied to coil 86 of control valve 74. Control valve 74 contains an armature vane 88 which is secured near its fixed end to a spring hinge member 90 which is made of flexible resilient material so that armature vane 88 moves back and forth as viewed in FIGURE 6 to selectively close or open apertures 92 and 94, in accordance with the magnitude of current through coil 86. Armature vane 88 is spring biased to cover aperture 94 when no current is present in coil 86 to thereby cause control valve 74 to be in its closed position and no air to be supplied under pressure to bellows 66.

As best shown in FIGURE 5, control valve 74 is formed of two blocks 96 and 98 of a material such as aluminum or plastic which are separated sufficiently to permit armature 88 to move in the space between the adjacent faces. Block 96 is provided with two separate fluid channels 100 and 102 which are in alignment with apertures 92 and 94 in block 98. Apertures 92 and 94 are connected by a U-shaped fluid channel 104, the outlet port of which is connected by hose 106 to bellows 66. Channel 100 in block 96 is connected to air supply source 76 while channel 102 is simply open to the atmosphere.

Armature 88 is spring biased to normally block off conduit 100 to thereby prevent air flow to bellows 66 from air supply source 76. Current through relay coil 86 pulls armature 88 upwardly as viewed in FIGURE 5 toward a position which covers aperture 92 and opens aperture 94 whereby the flow pressure from the air supply source is supplied to bellows 66.

Referring now to FIGURE 1, when air expansion chamber 66 is expanded, rod 68 is pushed toward the right thereby tilting upper drive unit 22 counterclockwise about the axis of fulcrum 24. This has the effect of causing the rear, downwardly moving side of the belt to be delivered along the central plane of drive unit 22 which has been shifted to the left to thereby cause the edge of the belt passing photocell 84 to shift toward air expansion chamber 66 and toward the left as viewed in FIGURE 1. When the edge of belt 20 on the downwardly moving rear portion of the belt advances too far to the left, the current through relay 86 of FIGURE 6 is reduced whereby armature 88 drops down to cover aperture 94 to thereby reduce the flow of air into air expansion chamber 66. This reduced pressure coupled with the action of tension spring 80 causes upper drive unit 22 to pivot in a clockwise direction about the axis of fulcrum 24 to thereby deliver the belt in a central plane which has been shifted to the right as viewed in FIGURE 1.

A similar position correcting mechanism is also provided for lower drive unit 23 which has its belt edge detector positioned on the side of the belt which is delivered from drive unit 23 and at a position close to upper drive unit 22 and remote from lower drive unit 23 to thereby provide at correcting movement for drive unit 23 about the axis of fulcrum 25 to compensate for any undesired lateral deviation of the upwardly moving front surface of the belt.

The foregoing described belt positioning control system is effective for high belt velocities of the order of 1,100 inches per second which are used in magnetic storage mediums for computer installations. Both photocell units may be on the same side of the frame assembly in the event only one side of the belt is to be used as a reference surface. The signal channels extend side by side across the width of the belt in closely spaced parallel lines as in the case of magnetic drums. The signal channels may be spaced, in accordance with dimensions of the magnetic head construction techniques and with certain types of magnetic heads as closely together as 16 per inch. On a tape, the width of which is 21 inches as is available commercially from manufacturers of such magnetic tape material, roughly 300 recording channels may be used. In view of the belt speed and signal channel spacing distances as well as the fact that the signal from the recording head decreases approximately exponentially as the distance between the pickup head and recording channel increases, it is apparent that the belt position control system for this type of storage unit must operate almost instantaneously to correct any tendency of the belt to deviate laterally from its reference position if satisfactory reliability of the operation of the computer is to be obtained when using the memory of the present invention. With the belt position correcting system illustrated, actual lateral deviation of the belt may be as little as a few millimeters, which considering the belt velocity, is very small.

Figure 4:
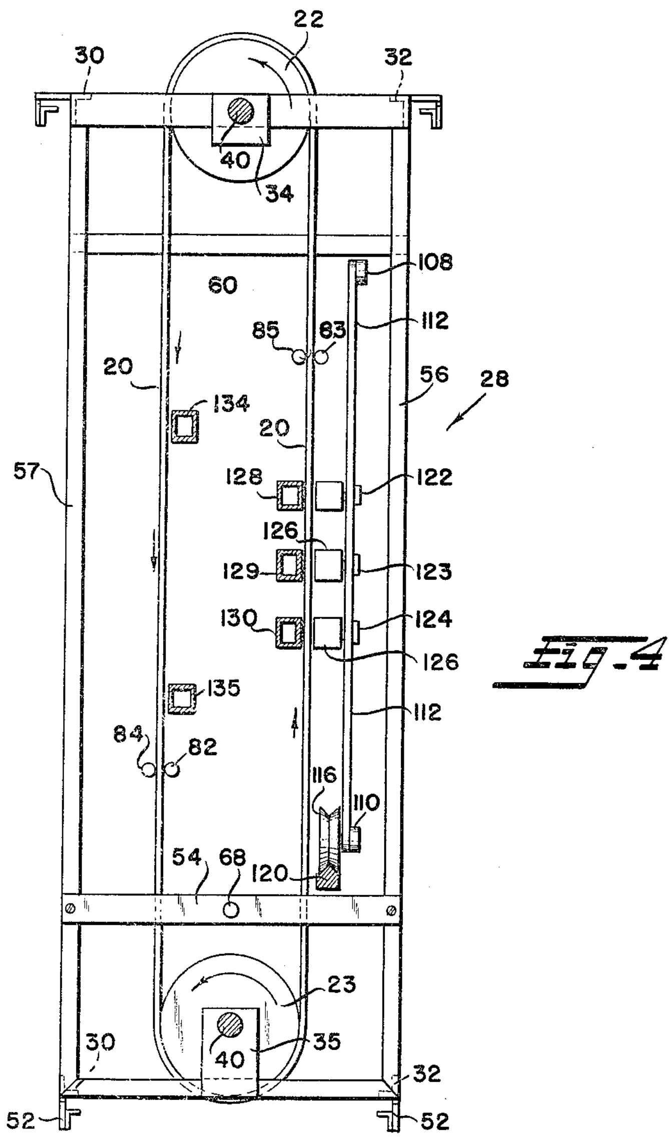
FIGURE 4 is a side elevation view of the storage unit of FIGURE 3.

To further reduce the variations in the distance between the pickup heads and magnetic belt 20, the pickup heads are mounted on parallelogram frame 28 which is best shown in FIGURES 2, 3 and 4. FIGURE 2 is a fragmentary view of the same embodiment shown in FIGURES 1, 3 and 4, but with many of the parts omitted to more clearly show the detailed mounting arrangement of parallelogram frame 28 and other features which are provided to maintain a uniform minimum distance between the recording heads and the surface of magnetic belt 20.

Turning now to FIGURES 2, 3 and 4, parallelogram frame 28 is composed basically of upper horizontal member 108, lower horizontal member 110 and two vertical members 112 and 114, all of the connections between the ends of these members permitting pivotal movement of one member relative to the others. Lower horizontal member 110 is mounted on rollers 116 and 118 which, in turn, are adapted for rolling movement along fixed frame member 120. Lower horizontal member 110 is formed with one end connected to lower horizontal bar 54 and thus is movable laterally across belt 20 concomitantly with any correcting movement supplied from air expansion chamber 66 to bar 54 of the upper drive unit 22. The direction of movement of lower horizontal member 110 is in the same sense as any belt deviation which is detected by the belt position sensing element or photocell 82 of control means 26 for the lower portion of magnetic belt 20.

Upper horizontal member 108 is similarly connected to move with upper horizontal bar 60 in accordance with the correcting displacement supplied by air expansion chamber 70 through link 72 for the lower drive unit 23. Thus a lateral or horizontal displacement of upper horizontal member 108 is effected concomitantly with the application of the correcting movement applied to drive unit 23 in response to a lateral deviation of the upper front side of belt 20 adjacent photocell 83.

Mounted between vertical members 112 and 114 are three horizontally disposed head mounting members 122, 123 and 124. Each of head mounting member 122, 123 and 124 is secured at its ends to be pivotally connected to vertical members 112 and 114. While only three head mounting members are shown in the drawings, it is obvious that a greater number of the head mounting members may be similarly secured to vertical members 112 and 114 to be along the surface of belt 20 between drive units 22 and 23. Also, second parallelogram rack similar to rack 28 could be mounted on the opposite side of the belt drive unit of the present invention to thereby provide a greater number of positions for heads along the path of the belt if desired.

On each of head mounting members 122, 123 and 124, one or more electromagnetic heads 126 may be mounted. While recording heads 126 may be of any conventional type, the housing in which such recording heads are mounted are preferably of the type known as an air floating head, such for example as disclosed in my application mentioned above or as disclosed in U.S. Patent No. 2,905,768 to Cronquist. In such floating heads, a flat surface is provided which faces the recording surface on belt 20 and apertures are provided through which air under pressure is directed from the recording head onto the surface of belt 20 as is pointed out in my above-identified application disclosure and in the above-identified patent. The use of such air pressure techniques results in a stabilized spacing between the surface of the recording head and the adjacent surface of belt 20, and by varying the pressure or air flow rate extremely fine adjustment of the spacing may be obtained.

Heads 126 may be rigidly secured to head mounting members 122, 123 and 124 either in alignment, or staggered so as to be permanently positioned adjacent a different channel on belt 20 to be used in the same manner as they are used with magnetic drums.

In the same horizontal plane with head mounting members 122, 123 and 124 are air bearing tubes 128, 129 and 130 respectively. Air bearing tubes 128, 129 and 130 are mounted on the opposite side of belt 20 from recording heads 26 and are provided with a plurality of apertures facing magnetic belt 20 through which air under pressure is supplied from air supply source 76 and air line 132 to the hollow interior of tubes 128, 129 and 130. By proper adjustment of the air flow through air bearing tubes 128, 129 and 130 coupled with the air flow from recording heads 126, it is possible to maintain magnetic belt 20 in a precisely controlled position at the desired distance from the electromagnetic elements of pickup heads 126. By this construction, any vibration of the belt in the plane normal to the direction of belt movement is obviated to thereby provide reliable operation of the storage unit at the desired high belt speeds to give the requisite short access time.

Similar air bearing tubes 134 and 135 are provided adjacent the downward moving side of belt 20 at a spaced position with a series of apertures facing the belt to thereby hold the belt in approximate vertical position and prevent undesired vibrations in a horizontal plane normal to the direction of the belt velocitly. Vibrations of belt 20 are particularly undesirable since they tend to cause stretching of the belt, and proper tautness of the belt is essential for the high belt velocities present in a device of this type.

Each of air bearing tubes 128, 129, 130, 132 and 133 may be formed of square tubing of a material such as aluminum having side dimensions of about ½ inch or 1 inch and the apertures facing the belt may be made using a Number 60 drill with the holes located on ½ inch centers.

Figure 7:
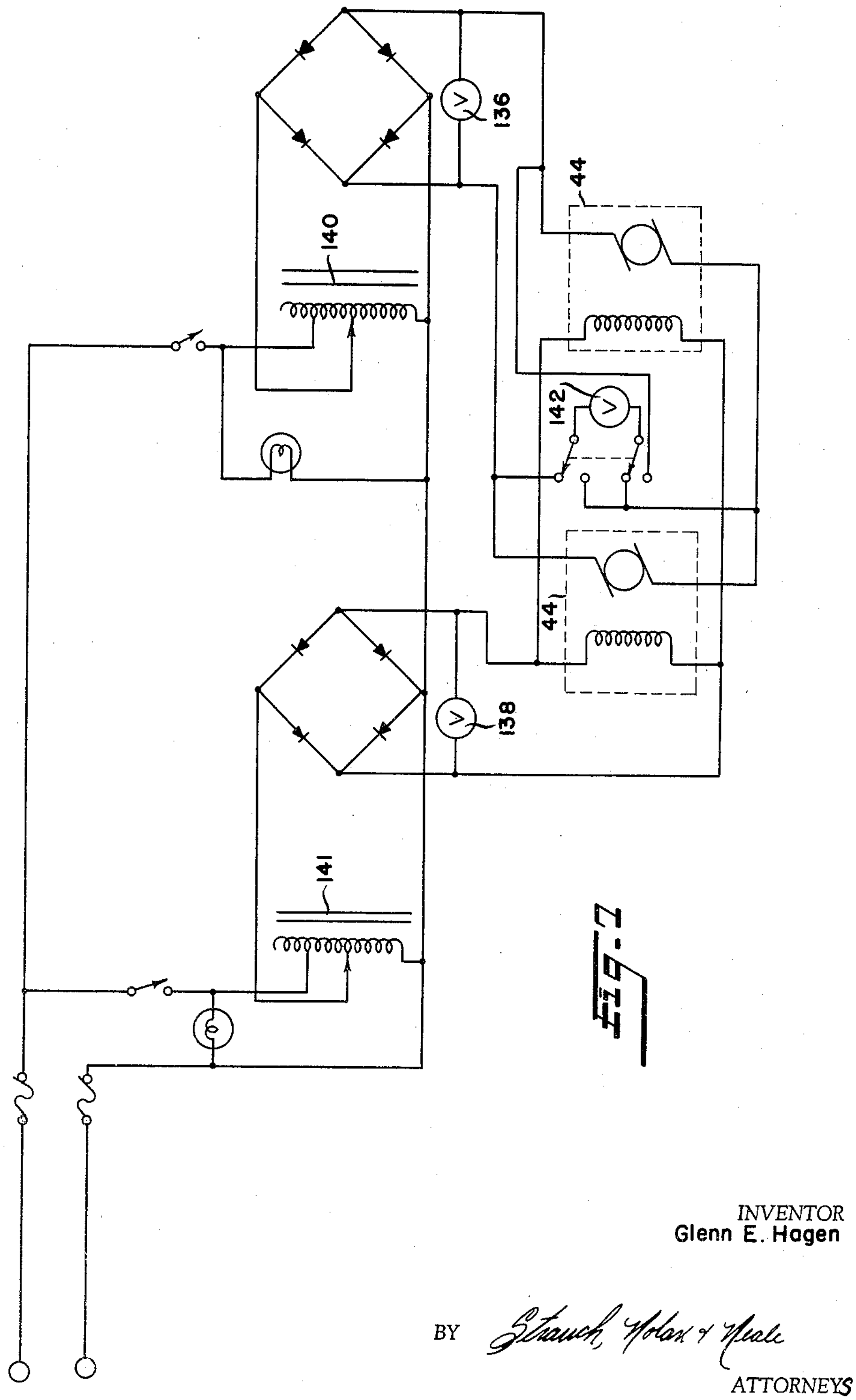
FIGURE 7 is a wiring diagram showing the control system for the motors which drive the pulleys for the magnetic belt.
Figure 9:
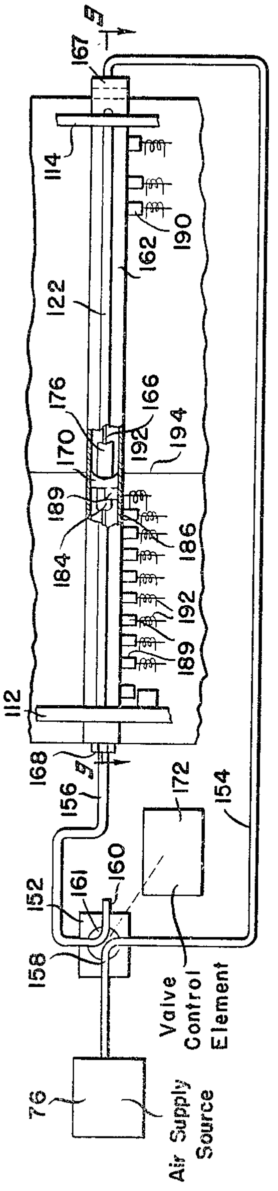

From the foregoing, it is apparent that many special features have been employed to assure that magnetic belt 20 will be capable of operation at the necessary high velocity without lateral deviation and without vibration or flapping in a plane perpendicular to the belt velocity. To further reduce the mechanical load on the belt, special precautions are taken so that motors 44 for upper drive unit 22 and lower drive unit 23 are properly synchronized to prevent stretching of the belt. With reference now to FIGURE 7, a special motor power supply circuit is illustrated wherein the upper and lower motors of 44 are D.C. shunt wound motors and supplied from the usual 115 volts A.C. through variable auto transformers and rectifier bridges which provide a source of variable D.C. voltage. Separate voltmeters 136 and 138 are provided to assist the operator in proper adjustment of variable auto transformers 140 and 141. A further meter 142 is provided with switching contacts to permit the voltage across the armature of the upper and lower motors to be compared whereby during normal running operation each of the motors will be supplying an equal amount of driving torque to magnetic belt 20 and thereby eliminate as much as possible any tendency for one drive unit to be supplying turning torque to the other drive unit which would have the effect of shortening the belt life of belt 20.

In operation, the acceleration of drive motors 44 is held to as low a rate as possible to prevent tearing or stretching of the belt as the velocity of the belt increases from 0 up to the desired belt speed of approximately 1100 inches per second. The operation of control means 26 and 27 for holding the belt in a reference position on drive units 22 and 23 may be observed at intermediate speeds and if any deviation is present which is not corrected which would indicate malfunction of the belt position correcting mechanism, the motors can be stopped before damaging magnetic belt 20. With a belt width of approximately 21 inches and a total belt length of the order of 20 feet, the belt positioning mechanisms as described have been found sufficiently responsive to maintain the belt in this desired position on drive units 22 and 23. When any deviation does occur, correcting mechanisms are immediately placed into operation and simultaneously magnetic heads 126 are shifted by parallelogram 28 in a direction and by an amount proportional to the detected belt displacement. This feature reduces the probability of improper recording or playback even though the belt should wander slightly in lateral direction during its high speed operation.

For example, should the belt at lower pulley unit 23 be detected by photocell 82 as being too far to the right, upper drive unit 22 is acted upon to move belt 20 toward the left. The operation of control valve 74 shown in FIGURES 5 and 6 is such that it supplies air under pressure to air expansion chamber 66 to provide a pushing force on link 68 against horizontal cross member 54 to thereby push lower horizontal member 110 of parallelogram 28 to the right and thus shift the read out and recording heads 126 to the right by an amount proportional to their spacing between upper and lower horizontal members 108 and 110 respectively to correspond with the detected lateral displacement of the belt. Thus, when a lateral shaft of the belt is detected by only one of the photocells, the corresponding end of parallelogram 28 is immediately moved in the direction of the lateral shift of the belt to thereby cause the recording heads to track with the corresponding recording channels on belt 20.

The same displacement of horizontal member 54 which moved lower horizontal member 110 of paralellogram 28 to the right also causes upper drive members 22 to pivot about the axis of fulcrum 24 in a counterclockwise direction to thereby cause the belt delivered from pulley 24 to shift to the left and thus provide a corrective action for repositioning belt 20 from a lateral deviation assumed in the foregoing example to be to the right. A similar corrective action occurs when the lower portion of belt 20 is detected by the photocell to have shifted laterally to the left. The displacements in each case are in an opposite direction to effect the corrective action.

Should a lateral deviation of belt 20 be detected by upper photocell unit 83, the corrective action is then supplied by control valve 78 increasing or reducing, as the case may be, the pressure to air expansion chamber 70 to thereby shift upper horizontal member 108 of parallelogram frame 28 whereby recording heads 126 are caused to follow the lateral shift of the belt. Again the magnitude of the lateral shift of recording heads 126 is proportional to the relative location of the particular recording head between upper and lower horizontal members 108 and 110 respectively of the parallelogram frame. If both upper and lower horizontal members 108 and 110 are shifted an equal distance, then all the recording heads 126 shift the same equal distance. Simultaneously with the shift of upper horizontal member 108 there is a corresponding rotation of lower drive unit 23 about the axis of fulcrum 25 which provides a corrective movement to return magnetic belt 20 to its desired central or reference position. As the belt returns to its position, the correcting displacement applied from air expansion chamber 70 is decreased to thus return the various parts to their initial or normal operating position.

Figure 9:
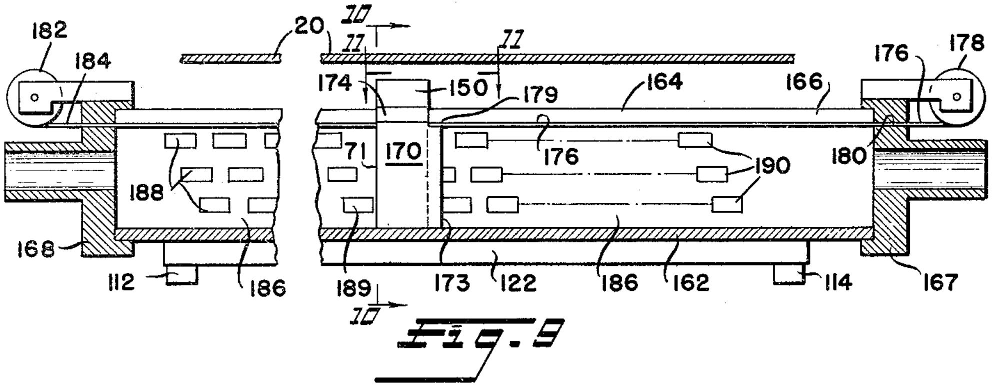
FIGURE 9 is a partial plan view taken along line 9—9 of FIGURE 8.

FIGURES 8 and 9 are front elevation and top plan views of a novel arrangement for the positioning of an electromagnetic head 150 which is adapted to be operative relationship with selected ones of the parallel recording channels on magnetic tape 20. In accordance with one feature of the present invention, electromagnetic head 150 is mounted to be slidable along one of the head mounting members 122 of parallelogram frame 28 laterally across belt 20 of the unit as shown in FIGURES 1 through 4, and is adapted to be "blown" into position by air from air supply source 76 through valve 152 and air conduits 154 and 156. Obviously the head positioning arrangement to be described may also be used with magnetic drums.

Valve 152 is provided with an inlet port 158 which is connected to air supply source 76 and an outlet port 160 is open to the atmosphere or otherwise connected to the lower pressure side of an air pump. The other ports joined to conduits 154 and 156 are connected to opposite end walls 167 and 168 of hollow tubular pipe 162 which is secured to move with head mounting member 122.

Valve 152 is also provided with a central element 161 which is adapted to pivot or rotate so that in a position 90° from the illustrated position, air under pressure is applied to conduit 156 rather than to conduit 154 as occurs when element 161 is in its illustrated position.

Tubular pipe 162 may have any suitable cross-section which, in the illustrated embodiment, is rectangular as best shown in FIGURE 10. The interior dimensions are effectively uniform throughout the length of tubular pipe 162 and wall 164 which faces magnetic belt 20 may be provided with a longitudinal slot 166 which is as narrow as practical to avoid excess escape of air from the interior of pipe 162. Suitable air conduit terminals are provided in the opposite end walls 167 and 168.

Electromagnetic head 150 is positioned on side wall 164 of tubular pipe 162 facing magnetic belt 20 as best shown in FIGURES 9, 10 11 and 12. While it is only essential that the magnetic gap be positioned immediately adjacent belt 20, in this embodiment the entire head is located outside of tubular pipe 162. The rear surface of electromagnetic head 150 is attached to or otherwise joined with a sliding piston member 170 which is adapted to be driven through tubular pipe 162 in either direction by air under pressure from supply source 76 in accordance with the position of valve 152 as determined by valve control means 172, which may be of any suitable conventional construction such as an electrically actuated solenoid. The contour of piston member 170 conforms with the contour of the inside walls of pipe 162. A narrow extension 174 which extends through slot 166 rigidly holds head 150 to piston 170 and has a length substantially equal to the thickness of the walls of pipe 162. The rear wall of head 150 slides along the outer face of wall 164 of pipe 162 to provide sufficient rigidity to prevent up and down movement of head 150 along the path of movement of belt 20. On the other hand, the fit of the walls of piston 170 and head 150 with pipe 162 is such that a low friction sliding movement is obtained.

The width of slot 166 is as small as is practicable, such for example as roughly $1/16$ inch. Thus when head 150 is positioned at the left side of belt 20, the total open slot area is a little more than one square inch. To obtain effective operation, the area of the air conduits from air supply source 76 is considerably larger than one square inch and the capacity of air supply source 76 must be adequate to withstand this leakage.

Various techniques may be used to cover slot 166 in tube 162 excepting for the area taken up by extension 174 adjacent head 150. For example, a tape 176 having a width sufficient to cover slot 166 may have one end secured to piston 170 as illustrated in FIGURES 8 and 9, and be wound on reel 178 supported on end wall 167. End wall 167 is provided with a slot 180 through which tape 176 extends. Reel 178 may be spring biased to automatically wind tape 176 when head 150 is moved to its reference position at the right end of tube 122. The rewinding force supplied by reel 178 to tape may thus be used to provide a force for the repositioning of piston 170 adjacent right end wall 167, or as an assist to the air pressure supplied through conduit 156 and end wall 168.

As a further feature, a second reel 182 may be provided on left end wall 168 with tape 184 secured to the left side of piston 170 to thereby cover at all times the portion of slot 166 to the left of piston 170. This increases the effectiveness of the air blast through conduit 156 to return piston 170 to its reference position at the right end wall 167. Where two reels are used, the force supplied by the tension of the springs in both of reels 178 and 182 should be small relative to the force supplied by the air blast against piston 170 for rapid movement of piston 170 through tube or pipe 162. Also, the mass of piston 170 is preferably as small as is practicable for quick starting and stopping. The right side surface 173 of head 170 is preferably made convex to reduce the mass of piston 170 which provides an upper and lower surface of sufficient length to prevent any rocking movement piston 170.

Alternatively, the use of slot 166 may be avoided altogether as electromagnetic head 150 may be mounted on a base 175 (see FIGURE 13) mounted to slide along a T-shaped groove 177 provided in side wall 164 of pipe 162. Inside base 175 one or more permanent magnets 179 having N and S poles may be positioned adjacent the narrow wall section 181 of a non-magnetic material such as aluminum or an insulating plastic material. Piston 170 may be provided with one or more similar permanent magnets 183 with the N and S poles reversed to provide a magnetic coupling through the narrow wall section 181. Due to the magnetic field strengths of permanent magnets 179 and 183, piston 170 and electromagnetic head 150 are effectively joined to be movable together, and with no slot in wall 164 being required through which air would escape.

The lower side 186 of pipe 162 is provided with a large number of retractible plungers of which only plungers 188, 189 and 190 are identified by reference numerals in FIGURE 9, and which are normally maintained in a position so that their upper surface is flush with the inside surface of lower side 186 and selectively movable upwardly by their associated solenoids 192. The right edge of each plunger is adapted to be in a position to abut the left end wall 171 of piston 170 when its associated solenoid 192 is energized. With the number of recording channels on belt 20 for head 150 equal to and correspondingly spaced with the number of plungers, precise positioning of the head 150 may be effected.

In operation, head 150 and piston 170 may be assumed to be positioned at the right end of pipe 162. If it is desired to record information into or read information out of channel 194 of tape 20 shown in FIGURE 8, the solenoid 192 associated with plunger 189 is energized. Then valve control element 172 is actuated to transfer the central element 161 of valve 152 to the position illustrated whereby air under pressure is applied through conduit 154 to the right end wall 167 to blow piston 170 over to its illustrated position against plunger 189. This then aligns the magnetic pick-up elements in head 150 with the selected recording channel 194 on belt 20.

When it is desired to move head 150 to another recording channel on belt 20, valve control means 172 is actuated to rotate central element 161 by 90° whereby air under pressure from source 76 is directed through conduit 156 to end wall 168 to thereby blow piston 170 back to its starting position. Conduit 154 is then connected to outlet port 160 of valve 152 and system remains in this condition until a new recording channel is selected.

Referring now to FIGURE 14, the electrical control circuit for the electromagnetic head positioning system as shown in FIGURES 8 through 12 is diagrammatically illustrated. A source of D.C. operating power diagrammatically indicated as battery 196 has one terminal connected to ground and the other terminal connected to lead 198. Switch 199 is provided which has one terminal connected to lead 198 and the other terminal connected to the solenoid in valve control element 172 whereby valve 152 may be in its alternative position when switch 199 is open and in the position illustrated in FIGURE 8 when switch 199 is closed.

Separate independent switches 200 are provided for each of the solenoids 192 for plungers 188, 189 and 190. For control of the above-described operation, a selected one of switches 200 is closed to thus raise one of the plungers, such as plunger 189, as shown in FIGURES 8 and 9. Then switch 199 is closed to thereby reverse the flow of air through pipe 162 and blow piston 170 into position against the raised plunger 189. During the period when head 150 is in operative relationship with the recording channel on belt 20, the selected switch 200 and switch 199 remain in a closed position. At the end of the reading cycle, both of the switches 199 and 200 in the closed position are returned to their open position to thereby cause piston 170 to return to its initial position adjacent right end wall 167 of tube 162.

Referring now to FIGURES 15 through 18, a further arrangement for positioning the recording head 150 in operative relation with any one of the recording channels is illustrated wherein a tubular member or pipe 202 is provided having end walls 204 and 206 each having air duct connecting terminals 205 and 207 for connection into the system shown in FIGURE 8. Piston element 208 is adapted to be driven along the length of pipe 202 when air under pressure is supplied to terminal 205 and is adapted to be returned to its initial position as shown in FIGURE 16 when air under pressure is supplied to terminal 207. Pipe 202 has an upper wall 210 and side walls 212 and 214, the latter wall being grooved for carrying the electromagnetic head as described in detail in connection with FIGURE 13.

The lower surface of pipe 202 is composed of a plurality of blocks 216, 218, 220, 222, 224 and 226. The thickness or dimension of blocks 216 through 226 in the direction of piston travel may vary in accordance with the binary counting system whereby block 226 has a thickness of one unit, block 224 has a thickness of two units, block 222 has a thickness of four units, and block 220 has a thickness of eight units, block 218 has a thickness of sixteen units and block 216 has a thickness of thirty-two units. The upper surfaces of each of blocks 216 through 226 normally lie in a common plane and thus provide a surface across which piston element 208 may slide.

Each of blocks 218 to 226 is mounted on a supporting member 228, 230, 232, 234 and 236. Each of the supporting members 228 through 236 is movable upwardly as by means of solenoid plungers or other similar electrically actuated device. Six solenoids are diagrammatically indicated by windings 238, 240, 242, 244 and 246.

Block 216, which is not slidable longitudinally of tube 202, may be similarly raised by solenoid 248. Thus, each of blocks 216 through 226 inclusive may be raised individually so that none, all, or any combination thereof, are placed in the path of piston element 208 to thereby determine which of the information channels on belt 20 will be placed in operative relationship with the electromagnetic head carried by piston 208.

FIGURE 17 is a view taken along lines 17—17 of FIGURE 15 showing block 216 in its lowered position. This block is raised anytime the desired information channel on belt 20 lies in the righthand half of magnetic belt 20. Otherwise, block 216 remains in its lowered position as shown in FIGURE 15 whereby piston element 208, along with any blocks 218, 220, 222, 224 or 226 which may be raised, can slide across the upper surface 250 to abut against surface 252 of end wall 206.

FIGURE 18, which is a view taken along lines 18—18 of FIGURE 15, shows piston element 208 in the central position of tube 202 with magnet 254 adjacent side wall 214. Block 218 resting on support member 228, serves as a sliding surface for piston element 208. On the inside surface of upper wall 210, a series of stepped surfaces are provided which serve as means for selectively stopping each of blocks 218 through 226 at their normal position on their corresponding supporting members 228 through 236. Block 218 has a cross section which corresponds to the full inside dimensions of tube 202. Thus, when it is returned toward the right as when air under pressure is supplied through end wall 206, abutment surfaces 256 are present to stop block 218 over its supporting member 228.

Block 220 has an upper surface contour which has been modified by removal of the upper corners to thereby permit it to pass by surfaces 256 but to be stopped by abutment surfaces 258. Block 222 has likewise been modified by removing material from the upper corners, the amount of material having been removed in this case being sufficient to permit block 222 to pass abutment surfaces 256 and 258 and to advance to abutment surfaces 260. One final abutment surface 262 is provided in the center portion of the upper wall of 210 of pipe member 202 and block 224 is so constructed so as to advance to abutment surface 262 before being stopped to thereby be in position over its corresponding member 234.

The final block 226 of unit thickness may have the same contour as piston element 208 to thereby slide into position over its corresponding supporting member 236. Piston 208 is formed so as to be free to move to the right until it abuts surface 264 of right end wall 204.

In the drawings, the size of abutment surfaces 256 through 262 has been exaggerated for clarity of illustration. In practice, the inside walls of tube pipe 202 and block and all of the sliding blocks are carefully machined so that precise positioning of piston element 208 and the magnetic head which it carries may be obtained. Thus, the abutment surfaces of 256 through 262 may extend only a few thirty-seconds of an inch down from the upper wall 210 of pipe 202. Other equivalent keyway or camming surfaces may be used to assure that sliding blocks 218 through 226 are stopped over their corresponding support member when air is supplied to end wall 206 and piston 208 is returned to end wall 204.

Referring now to FIGURE 19, switches 266, 268, 270, 272, 274 and 276 have one terminal connected to a line 278 of a grounded power supply (not shown). Convention coding circuits such as the tree relay circuit may be used to actuate switches 266 through 276. In FIGURE 19, switch contacts 270 and 274 are shown closed in which case solenoids 240 and 244 are energized and supporting members 230 and 234 are raised whereby blocks 220 and 224 are placed in the path of piston element 208. When air is supplied under pressure through end wall 204, piston 208 picks up blocks 224 and 220 as it moves to the left along pipe member 202 and laterally across belt 20 to a recording channel at a distance from a left side of the belt corresponding to the combined thickness of the selected spacer blocks 220 and 224. After operation of the memory unit with the recording head at that particular information channel has been completed, valve 152 of FIGURE 8 may be transferred to thereby supply air under pressure to the left end wall 206 which then drives spacer 220 over against abutment surfaces 258 at which time supporting member 230 and spacer 220 drop down into the normal position as shown in FIGURE 15. The continued application of air pressure against spacer block 224 causes it to advance to abutment surface 262 to be in alignment with its corresponding supporting member 234 which also then drops into its normal position as shown in FIGURE 15; and piston element 208 continues to its reference position against surface 264 of end wall 204, after which time the system is then ready for selection of another group of spacer blocks to reposition the head adjacent belt 20.

Several advantages are achieved by use of the construction shown and method described in connection with FIGURES 15 through 19. By positioning the narrowest and hence lightest weight spacers adjacent piston element 208 when in its reference position against surface 264 of end wall 204, maximum travel is confined to these lightest spacers. The entire left-hand half of the tube is composed of one stationary spacer 216 which does not need to be slid axially along pipe member 202. Thus, the arrangement as illustrated whereby the correspondingly thinner spacers are positioned adjacent the reference position of piston element 208 at the right end wall 204, is highly desirable in making possible the rapid positioning of the magnetic head to selected channels on the memory belt member 20.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A storage device comprising an endless belt of magnetizable material supported around first and second vertically spaced belt drive units; each of said units being mounted for pivotal movement about horizontal axis located between the edges of said belt and oriented perpendicularly to the axis of the corresponding belt drive unit; separate means for driving each of said units at synchronous speeds to give the belt a lineal velocity of at least 500 inches per minute; a parallelogram support frame having opposite ends adjacent said belt drive units and a centrally located cross bar; an electromagnetic head mounted on said cross bar to be in operative relation with said belt surface generally centrally between said drive units; separate belt position detecting means on the belt receiving side of each of said belt drive units for producing an output signal in response to lateral displacement of said belt; a first air expansion chamber having a movable member connected to control the lateral displacement of the upper end of the parallelogram frame and pivotal movement of the lower belt drive unit and a second similar air expansion chamber connected to control the lateral displacement of the lower end of the parallelogram frame and the upper belt drive unit; means including separate variable air flow valves connected to be controlled by the output signal from each of said belt position detecting means for supplying controlled quantities of air under pressure to said air expansion chambers; a means to reduce vibrational movement of the belt in a direction perpendicular to the direction of belt movement at the position of the electromagnetic head comprising a member having a flat surface provided with apertures facing the surface of the belt and means for supplying air under pressure to said apertures for providing an air cushion and substantially constant spacing between said flat surface and the facing surface of said belt.

2. The storage device as defined in claim 1 wherein said last-mentioned member comprises a hollow bar extending across the belt on the side of the opposite said electromagnetic head and contains apertures substantially opposite the active portion of said head.

3. The storage device as defined in claim 2 wherein said electromagnetic head has a flat surface facing said belt, there being an aperture in said surface and means supplying air under pressure to pass through said aperture toward the belt surface.

4. In a belt positioning system having a pair of spaced belt drive units with one of said drive units mounted for pivotal movement about an axis normal to a plane containing said belt, belt edge position detecting means of the type adapted to produce an electrical voltage in accordance with the lateral deviation of the belt edge, an air control valve comprising a main body having a pair of fluid conducting bores, said body being formed to provide a space separating each of said bores into two parts, a vane member of resilient material having one end fixed relatively to said body and another end movable in said space to selectively cover either of said bores, an electromagnet operatively coupled to said vane to control the position of said vane in accordance with the current supplied to said electromagnet, a fluid expansion chamber connected to control the pivotal movement of said one drive unit and having an inlet port and an outlet port open to atmospheric pressure, conduit means for connecting one end of each of said fluid conducting bores to the inlet port of said fluid expansion chamber, a source of air under pressure, and means connecting the other end of one of said fluid conducting bores to said source and of the other of said fluid conducting bores to atmospheric pressure whereby a lateral deviation of said belt edge causes a voltage signal to be produced which determines the position of said vane and thereby the displacement of said fluid expansion chamber to thus supply a correcting movement to said one drive unit.

5. The belt positioning system as defined in claim 4 wherein said belt edge position detecting means comprises a light source and light sensitive photoelectric cell.

6. A storage device comprising an endless belt of magnetizable material supported around first and second spaced belt drive units; separate means for driving each of said units at synchronous speeds to give the belt a lineal velocity of at least 500 inches per minute; an electromagnetic head for recording and retrieving coded signals on said endless belt mounted at a position along the surface of and spaced from said belt at a position between said belt drive units; and means to reduce vibrational movement of the belt in a direction perpendicular to the direction of the belt travel adjacent said electromagnetic head during recording and retrieving operations comprising a member extending across a substantial portion at least of the width of the belt having means for producing an air cushion between said member and the belt.

7. A storage device comprising an endless belt of magnetizable material mounted on first and second spaced belt drive units; separate means for driving each of said units at synchronous speeds to give the belt a lineal velocity of at least 500 inches per minute; means to reduce the vibrational movement of said belt in a direction perpendicular to the direction of movement of the belt at a position between said belt drive units where said belt is moving in a straight line direction between said drive units comprising a hollow member having a series of spaced apertures facing said belt, said hollow member extending across a substantial portion of the width of the belt, and means for supplying air under pressure to said hollow member for producing an air cushion between said member and the belt.

8. A storage device comprising an endless belt of magnetizable material mounted on first and second spaced belt drive units; separate means for driving each of said units at synchronous speeds to give the belt a lineal velocity of at least 500 inches per minute; means to reduce the vibrational movement of the belt in a direction perpendicular to the direction of the belt movement at positions between said belt drive units comprising a hollow member extending across a substantial portion at least of the width of said belt, said hollow member having a flat surface facing the belt, said flat surface containing a plurality of apertures; and means for supplying air under pressure to said hollow member for producing an air cushion between said flat surface and the belt.

9. A storage device comprising an endless belt of magnetizable material mounted on first and second spaced belt drive units; means for driving the belt at a lineal velocity of at least 500 inches per minute; electromagnetic head means for recording and retrieving coded signals on said endless belt mounted at a position along the surface of said belt substantially centrally of said belt drive units; means to reduce vibrational movement of the belt in a direction perpendicular to the direction of the belt movement at positions between said belt drive units comprising a member having a flat surface provided with apertures at the position of said electromagnetic head facing the surface of the belt; and means for supplying air under pressure to said apertures for providing an air cushion and substantially constant spacing between said flat surface and the facing surface of said belt.

10. The storage device as defined in claim 9 wherein said member having a flat surface comprises a hollow tube extending across a substantial portion at least of the width of said belt and on the side of the belt opposite the position of said electromagnetic head means.

11. The storage device as defined in claim 9 wherein said member having a flat surface comprises an electromagnetic head mounting bar and a plurality of electromagnetic heads each having a non-magnetic gap secured thereto, each of said heads having said flat surface, said non-magnetic gap and said apertures being in said flat surface.

12. A storage device comprising an endless belt of magnetizable material mounted on first and second spaced belt drive units; separate means for driving each of said units at synchronous speeds to give the belt a lineal velocity of at least 500 inches per minute; an electromagnetic head for recording and retrieving coded signals on said endless belt mounted at a position along the surface of said belt substantially centrally of said belt drive units; said electromagnetic head having a flat surface facing the surface of said belt with at least one aperture in said flat surface of said head; means to reduce vibrational movement of the belt in a direction perpendicular to the direction of the belt movement at the position of said electromagnetic head comprising a member extending substantially across the width of the belt on the side of the belt opposite said electromagnetic head having a flat surface provided with apertures facing the surface of said belt; and means for supplying air under pressure to the apertures in said electromagnetic head means and in said member for providing an air cushion and constant spacing between said flat surface of said electromagnetic head means and the facing surface of said belt.

13. A storage device comprising an endless belt of magnetizable material mounted on first and second spaced belt drive units; separate means for driving each of said units at synchronous speeds to give the belt a lineal velocity of at least 500 inches per minute; an electromagnetic head for recording and retrieving coded signals in recording channels on said endless belt mounted at a position along the surface of said belt between said belt drive units; said electromagnetic head having a flat surface facing the surface of said belt with at least one aperture in said flat surface of said head; means to reduce vibrational movement of the belt in a direction perpendicular to the direction of the belt movement at the position of said electromagnetic head comprising a member extending substantially across the width of the belt on the side of the belt opposite said electromagnetic head means having a flat surface provided with apertures facing the surface of said belt; means for supplying air under pressure to the apertures in said electromagnetic head means and in said member for providing an air cushion and constant spacing between said flat surface of said electromagnetic head means and the facing surface of said belt; and means responsive to a lateral shift of said belt for causing a corresponding lateral shift of the electromagnetic head to keep the electromagnetic head in alignment with predetermined recording channels on said belt.

14. A storage device comprising an endless belt of magnetizable material mounted on first and second spaced belt drive units; separate means for driving each of said units at synchronous speeds to give the belt a lineal velocity of at least 500 inches per minute; an electromagnetic head for recording and retrieving coded signals in recording channels on said endless belt mounted at a position along the surface of said belt between said belt drive units; said electromagnetic head having a flat surface facing the surface of said belt with at least one aperture in said flat surface of said head; means to reduce vibrational movement of the belt in a direction perpendicular to the direction of the belt movement at the position of said electromagnetic head comprising a member extending substantially across the width of the belt on the side of the belt opposite said electromagnetic head means having a flat surface provided with apertures facing the surface of said belt; means for supplying air under pressure to the apertures in said electromagnetic head means and in said member for providing an air cushion and constant spacing between said flat surface of said electromagnetic head means and the facing surface of said belt; and means responsive to a lateral shift of said belt for causing a corresponding lateral shift of the electromagnetic head to keep the electromagnetic head in alignment with predetermined recording channels on said belt comprising a frame having a first and a second end adjacent the first and second belt drive units; said frame supporting said electromagnetic head at a position between said ends; one portion of said frame being mounted for movement in a direction laterally of said belt and a second portion of said frame ends being mounted for pivotal movement about said one portion; and means for moving the first and second ends of said frame in accordance with a lateral shift of the edges of said belt at positions adjacent the first and second belt drive units.

15. A storage device comprising an endless belt of magnetizable material mounted on first and second spaced belt drive units; separate means for driving each of said units at synchronous speeds to give the belt a lineal velocity of at least 500 inches per minute; an electromagnetic head for recording and retrieving coded signals in recording channels on said endless belt mounted at a position along the surface of said belt between said belt drive units; said electromagnetic head having a flat surface facing the surface of said belt with at least one aperture in said flat surface of said head; means to reduce vibrational movement of the belt in a direction perpendicular to the direction of the belt movement at the position of said electromagnetic head comprising a member extending substantially across the width of the belt on the side of the belt opposite said electromagnetic head means having a flat surface provided with apertures facing the surface of said belt; means for supplying air under pressure to the apertures in said electromagnetic head means and in said member for providing an air cushion and constant spacing between said flat surface of said electromagnetic head means and the facing surface of said belt; and means responsive to a lateral shift of said belt for causing a corresponding lateral shift of the electromagnetic head to keep the electromagnetic head in alignment with predetermined recording channels on said belt comprising a parallelogram frame having opposite ends adjacent the first and second belt drive units; said frame having a cross bar supporting said electromagnetic head at a position substantially centrally between said ends; the first end of said frame being mounted for movement in a direction laterally of said belt and the second end of said frame being mounted for pivotal movement about said first end; and means for independently moving the first and second ends of said frame in accordance with a lateral shift of the edges of said belt at positions at opposite ends of the parallelogram frame.

16. In combination, a magnetic recording medium having laterally spaced, parallel channels for recording information, an electromagnetic head operatively associated with the recording medium, and means for shifting said electromagnetic head laterally across said recording medium to be selectively positioned in an operative relationship with individual ones of said information channels comprising a piston member adapted to be blown by air under pressure along a path extending laterally across said recording medium, said electromagnetic head and said piston member being joined to be movable together, and means selectively operable for stopping said piston to properly position the electromagnetic head relative to a selected one of said information channels.

17. In combination, a magnetic recording medium having laterally spaced, parallel channels for recording information, an electromagnetic head operatively associated with the recording medium, and means for shifting said electromagnetic head laterally across said recording medium to be selectively positioned in an operative relationship with individual ones of said information channels comprising a hollow, tubular pipe positioned to extend laterally of said recording medium and across said information channels, said pipe having air duct connecting terminals at opposite ends thereof, a piston member mounted for sliding movement inside said pipe and adapted to be blown along said pipe by air under pressure supplied to said pipe terminals, said electromagnetic head and said piston member being joined to be movable together, and stop means on said pipe correlated with the position of said parallel information channels on said recording medium and cooperating with said piston for properly positioning the electromagnetic head relative to said information channels.

18. The combination as defined in claim 17 wherein said stop means comprises a plurality of plunger elements which normally are out of the path of said piston element, and means for moving said plunger members into the path of said piston element for controlling the position of the electromagnetic head.

19. The combination as defined in claim 18 wherein said plunger elements are mounted solely for a reciprocating movement in a plane perpendicular to the direction of movement of said piston element.

20. The combination as defined in claim 18 wherein said plunger elements are blocks having varying dimensions in the direction of the movement of said piston, and further including means for selecting various combinations of said blocks to properly position the electromagnetic head relative to the selected one of said information channels.

21. The combination as defined in claim 20 wherein the selected ones of said blocks are inserted into said pipe and adapted to be slid along said pipe by said piston element as it is blown along said pipe.

22. The combination as defined in claim 21 wherein the relative dimensions of said blocks in the direction of movement of said piston element vary in accordance with the binary code.

23. The combination as defined in claim 17 wherein the electromagnetic head is joined magnetically with the piston element.

24. The combination as defined in claim 23 wherein one wall of said tubular pipe contains grooves and said magnetic head is supported by a base adapted to slide in said grooves, there being permanent magnetic members movable with said base and said piston member.

25. The combination as defined in claim 17 wherein one wall of said tubular pipe contains a slot, said electromagnetic head and said piston member being mechanically joined by an extension member passing through said slot.

26. The combination as defined in claim 25 further comprising a reel, tape means wound on said reel and having a free end attached to said piston element at a position so as to cover said slot as said piston element traverses along the length of said pipe.

27. The combination as defined in claim 25 together with a pair of reels mounted on opposite ends of said pipe, a separate tape on each of said reels and free ends of each tape attached to opposite sides of said piston element so as to prevent air under pressure inside said pipe from escaping through said slot.

References Cited by the Examiner

UNITED STATES PATENTS

| | | | |
|---|---|---|---|
| 2,612,566 | 9/52 | Anderson et al. | 179—100.2 |
| 2,652,196 | 9/53 | Sterling | 340—174 |
| 2,654,599 | 10/53 | Frisbie | 226—21 |
| 2,782,030 | 2/57 | Webster et al. | 226—21 |
| 2,838,314 | 6/58 | Selsted | 251—129 |
| 2,874,929 | 2/59 | Klingler | 251—129 |
| 2,914,957 | 12/59 | Johnson | 226—23 |
| 2,962,200 | 11/60 | Pouliavt et al. | 179—100.2 |
| 2,967,545 | 1/61 | Schmidt | 137—625.25 |
| 2,969,435 | 1/61 | Lyno | 340—174.1 |
| 3,045,219 | 7/62 | Beckner et al. | 340—174.1 |
| 3,045,701 | 7/62 | Graham | 137—625.42 |
| 3,048,192 | 8/62 | Murphy | 137—625.42 |
| 3,056,950 | 10/62 | Birmingham et al. | 340—174.1 |
| 3,110,431 | 11/63 | Potter | 226—95 |

IRVING L. SRAGOW, *Primary Examiner.*